United States Patent
Tsai

(10) Patent No.: US 12,131,025 B2
(45) Date of Patent: Oct. 29, 2024

(54) METHOD FOR DELETING DATA ACCUMULATED BY AOI PROCESSES IN AIO, DATA DELETION DEVICE, DEVICE USING METHOD, AND NON-TRANSITORY STORAGE MEDIUM

(71) Applicant: HON HAI PRECISION INDUSTRY CO., LTD., New Taipei (TW)

(72) Inventor: Tsung-Hsien Tsai, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 146 days.

(21) Appl. No.: 17/895,492

(22) Filed: Aug. 25, 2022

(65) Prior Publication Data
US 2023/0325083 A1    Oct. 12, 2023

(30) Foreign Application Priority Data
Apr. 8, 2022 (CN) .......................... 202210369387.2

(51) Int. Cl.
*G06F 3/06* (2006.01)
*G06F 16/16* (2019.01)

(52) U.S. Cl.
CPC .......... *G06F 3/0608* (2013.01); *G06F 3/0652* (2013.01); *G06F 3/0674* (2013.01); *G06F 16/162* (2019.01)

(58) Field of Classification Search
None
See application file for complete search history.

(56) References Cited

U.S. PATENT DOCUMENTS

| | | | |
|---|---|---|---|
| 6,253,214 B1* | 6/2001 | Hall | G16H 30/20 707/999.001 |
| 8,224,129 B2* | 7/2012 | Kargar | G06F 16/51 382/128 |
| 10,026,007 B1* | 7/2018 | Morton | H04N 5/77 |
| 2006/0044417 A1* | 3/2006 | Tashiro | H04N 5/772 386/E5.072 |
| 2012/0302462 A1* | 11/2012 | Onfelt | G01N 33/505 506/10 |
| 2018/0181342 A1* | 6/2018 | Shimizu | G06F 3/0608 |
| 2020/0379954 A1* | 12/2020 | Shen | H04N 21/4424 |

FOREIGN PATENT DOCUMENTS

| | | | |
|---|---|---|---|
| CN | 101667180 B | | 10/2012 |
| CN | 111474184 A | | 7/2020 |
| CN | 114356856 A | * | 4/2022 |

* cited by examiner

*Primary Examiner* — Kaushikkumar M Patel
(74) *Attorney, Agent, or Firm* — ScienBiziP, P.C.

(57) ABSTRACT

A method for deleting data accumulated during Automated Optical Inspection (AOI) used during an AI process uses and applies three systems. The first system obtains an image of a current object under test and writes the image of the current object under test into a current file folder on a hard disk. The current file folder includes information of point-in-time storage. The second system performs AOI on the images of objects under test. If a space available on the hard disk at any time is less than a preset value, the third system deletes file folders that have earliest storage times from the file folders stored in the hard disk. A device and a non-transitory storage medium are also disclosed.

17 Claims, 6 Drawing Sheets

METHOD FOR DELETING DATA ACCUMULATED BY AOI PROCESSES IN AIO, DATA DELETION DEVICE, DEVICE USING METHOD, AND NON-TRANSITORY STORAGE MEDIUM

FIELD

The subject matter herein generally relates to artificial intelligence (AI)/Automated Optical Inspection (AOI) technology, and particularly to a method for deleting data gathered during AOI processes, a data deletion device, a device using method, and a non-transitory storage medium.

BACKGROUND

AI/AOI is a mainstream technology for detecting defects. During detections, a camera is employed to capture images of the objects under test and the captured images of the objects under test are stored in a hard disk. The stored images can be used for subsequent inspecting and data analyzing. However, after a long time or frequent detections for defects, a space of the hard disk may be full of images and other data, thus storage cannot continue. An operator is able to manually delete images from the hard disk one by one to free up the space of the hard disk when there is not enough space available, but a great number of I/O operations may be needed and a low system performance may be caused.

SUMMARY

An embodiment of the present application provides an accumulated data deletion method, an accumulated data deletion device, a device using method, and a non-transitory storage medium, which avoids a great number of individual I/O operations and improves a system performance.

In a first aspect, an embodiment of the present application provides an accumulated data deletion method. The method is applied on an automated optical inspection (AOI) device with many systems. The systems include a first system, a second system, and a third system. In the method, the first system obtains an image of a current object under test. The first system writes the image of the current object under test into a current file folder. The current file folder is stored in a hard disk of the AOI device. The current file folder is configured to store the images of the objects under test. The current file folder includes information of storage time by means of date and time stamps. The second system performs automated visual inspections on the images of the objects under test. If a space available on the hard disk is less than a preset value, the third system deletes one or more file folders that have earliest storage times from the file folders stored in the hard disk according to the date and time stamps until the space again available on the hard disk is equal to or greater than the preset value.

The accumulated data deletion method performs an automatic inspection on the current object under test according to the image of the current object under test, thus an AI/AOI inspection can be achieved. The accumulated data deletion method writes the image of the current object under test into the current file folder and deletes one or more file folders that have earlier storage times until the space available on the hard disk is equal to or greater than the preset value, thus the images can be batch deleted via in a file folder manner. The large amount of I/O operations can be avoided and the system performance can be improved. Further only when there is not enough space available on the hard disk, the accumulated data deletion method deletes the folders that have earliest storage times, thus a maximum of a reservation period can be ensured, an effective method to delete files can be performed, and a more stable operation and a longer time running can be ensured. The accumulated data deletion method brings together three different systems which are respectively the first system, the second system, and the third system into the AOI device, thus a cooperation among the different systems can be achieved by the automated optical inspection device, and it is convenient for the software development.

According to some embodiments of the present application, in the accumulated data deletion method, the first system creates a new file folder at a preset interval for creation and updates the new file folder to be the current file folder. Thus, the accumulated data deletion method creates the new file folder and updates the current file folder to be the new file folder, causing different file folders to store different images, it is convenient for subsequent deletion of the file folder that have earliest storage times.

According to some embodiments of the present application, in the accumulated data deletion method, the first system writing the image of the current object under test into a current file folder includes the first system writing the image of the current object under test into the current file folder to generate information of a current storage path of the image of the current object under test. In the accumulated data deletion method, the third system writes the information of the current storage path into a first file of a database if a current detection shows detection of no defects, and the third system deletes the images corresponding to the information of all the current storage paths of the first file from the hard disk at a preset interval for deletion. Thus, the accumulated data deletion method can delete the image whose detections show no defects from the hard disk and reserve the images whose detections are failed (that is, revealing a defect), thus a selective deletion of the images can be achieved, a reservation period of the images whose detections shows one or more defects can be improved, thereby the maximum of the reservation period of the images whose detections shows one or more defects can be ensured. Thus, the image whose detection shows one or more defects can be utilized to implement more applications, for example, an analysis of yield rate of a production line, an analysis of defect concentration, and so on.

According to some embodiments of the present application, in the accumulated data deletion method, before if the space available on the hard disk is less than the preset value, the third system deletes one or more file folders that have earliest storage times from the file folders stored in the hard disk according to the date and time stamps until the space again available on the hard disk is equal to or greater than the preset value, the third system writes the current detection result and information of the current file folder in the information of the current storage path into a second file of the database. If the space available on the hard disk is less than the preset value, the third system deletes one or more file folders that have earliest storage times from the file folders stored in the hard disk according to the date and time stamps until the space again available on the hard disk is equal to or greater than the preset value, the third system deletes data corresponding to information of the deleted file folders from the second file of the database. Thus, the accumulated data deletion method reserves the detection result and the information of the file folders, the second file can be utilized for subsequent analysis and can be utilized to determine running state of the production line together with the images.

According to some embodiments of the present application, in the accumulated data deletion method, the first system transmits information of the image including the information of the current storage path to the second system. The second system performing the automated visual inspections on the images of the objects under test includes the second system reading the image of the current object under test from the hard disk according to the information of the current storage path in the information of the image, and the second system performing the automated visual inspection on the image of the current object under test. Thus, the data detection method can transmit the information of the images between the first system and the second system, the image itself does not need to be transmitted, thus a transmission flow of the image can be reduced, and a transmission speed can be accelerated.

According to some embodiments of the present application, in the accumulated data deletion method, the second system transmits detection information including the information of the current storage path and the current detection result to the third system. The third system writes the information of the current storage path into the first file of the database if the current detection shows detection of no defects including that, the third system writes the information of the current storage path in the detection information into the first file of the database if the current detection result shows detection of no defects. Thus, the accumulated data deletion method transmits the detection result and the information of the storage path to the third system via the second system, it is convenient for the third system to perform the data analysis.

According to some embodiments of the present application, the second system and the first system communicate with each other via a representational state transfer application programming interface, and the third system and the second system communicate with each other via the representational state transfer application programming interface. Thus, in the data detection method, different systems communicate with each other via the representational state transfer application programming interface, it is convenient for different software/systems to transmit information between them, and one mode of bringing together different systems into the automated optical inspection device is achieved.

In a second aspect, an embodiment of the present application provides a data deletion device. The data deletion device includes an image obtaining module, an automated inspection module, and a data processing module. The image obtaining module is configured to obtain an image of a current object under test. The image obtaining module is further configured to write the image of the current object under test into a current file folder. The current file folder is stored in a hard disk of an AOI device. The current file folder is configured to store the images of the objects under test. The current file folder includes information of storage time by means of data and time stamps. The automated inspection module is configured to perform automated visual inspections on the images of the objects under test. If a space available on the hard disk is less than a preset value, the data processing module is configured to delete one or more file folders that have earlier storage times from the file folders stored in the hard disk according to the data and time stamps, until the space again available on the hard disk is equal to or greater than the preset value.

In a third aspect, an embodiment of the present application provides an AOI device including many systems. The systems include a first system, a second system, and a third system. The AOI device includes a storage device, and at least one processor. The storage device stores one or more programs, which when executed by the at least one processor, cause the at least one processor to obtain an image of a current object under test via the first system. The at least one processor writes the image of the current object under test into a current file folder via the first system. The current file folder is stored in a hard disk of the AOI device. The current file folder is configured to store the images of the objects under test. The current file folder includes information of storage time by means of data and time stamps. The at least one processor performs automated visual inspections on the images of the objects under test via the second system. If a space available on the hard disk is less than a preset value, the at least one processor deletes one or more file folders that have earliest storage times from the file folders stored in the hard disk according to the date and time stamps until the space again available on the hard disk is equal to or greater than the preset value via the third system.

In a fourth aspect, an embodiment of the present application also provides a non-transitory storage unit. The non-transitory storage medium stores a set of commands, the commands being executed by at least one processor of an automated optical inspection device with many systems which includes a first system, a second system, and a third system. Such systems enable the at least one processor to obtain an image of a current object under test via the first system. The at least one processor writes the image of the current object under test into a current file folder via the first system. The current file folder is stored in a hard disk of the AOI device. The current file folder is configured to store the images of the objects under test. The current file folder includes information of storage time by means of date and time stamps. The at least one processor performs automated visual inspections on the images of the objects under test via the second system. If a space available on the hard disk is less than a preset value, the at least one processor deletes one or more file folders that have earliest storage times from the file folders stored in the hard disk according to the date and time stamps until the space again available on the hard disk is equal to or greater than the preset value via the third system.

Details of the second aspect, the third aspect, the fourth aspect, and their implementation embodiments can refer to the description of the first aspect and the implementation embodiments of the first aspect, and details are not described herein again. Advantages of the second aspect, the third aspect, the fourth aspect, and their implementation embodiments can refer to advantages of the first aspect and the implementation embodiments of the first aspect, and details are not described herein again.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will therefore be appreciated that the embodiments may be modified within the scope of the claims.

In addition, it should be understood that in the description of this application, terms such as "first" and "second" are used only for distinguishing in the description, but are not intended to indicate or imply relative importance or an order. The terms "exemplary" and/or "example" are used herein to mean "serving as an example, instance, or illustration." Any embodiment described herein as "exemplary" and/or "example" is not necessarily to be construed as preferred or advantageous over other embodiments. A feature limited by "first", "second" may expressly or implicitly include at least one of the features. Use of the word "exemplary" is intended to present concepts and techniques in a concrete fashion.

It should be noted that the steps shown in the flowchart of drawings can be performed by computer executable instructions in a computer system. In addition, although a logical sequence is shown in the flowchart, in some circumstance, the shown or described steps may be performed in a sequence different from the sequence described herein.

Figure 1:
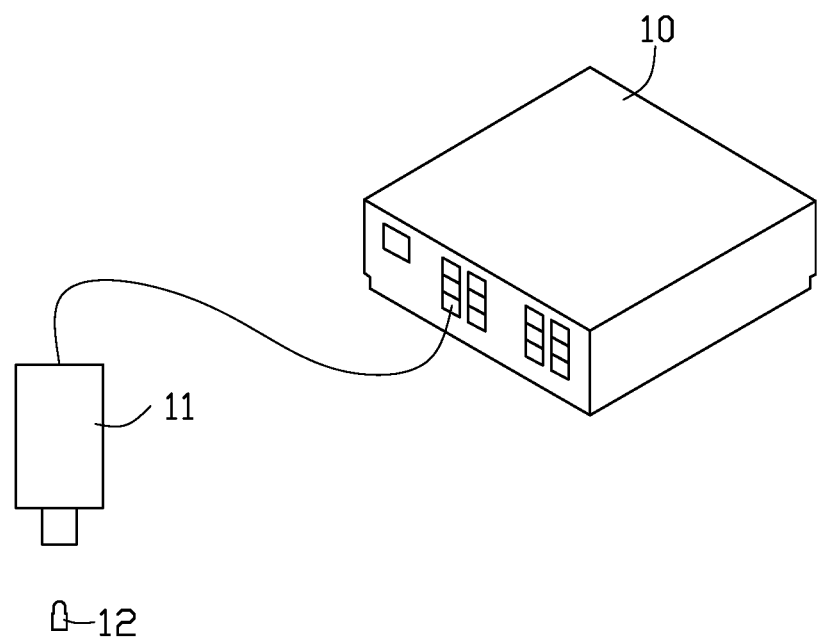
FIG. 1 is a schematic view of an embodiment of an application scenario of an automated optical inspection (AOI) device.

FIG. 1 is a schematic view of an embodiment of an application scenario of an automated optical inspection device (AOI device 10). As in FIG. 1, the AOI device 10 can be an industrial personal computer. It can be understood that, the AOI device 10 can be a computer, or the like, and the disclosure is not limited herein. The AOI device 10 can be coupled to a camera 11. The connection between the AOI device 10 and the camera 11 can be a wired connection or a wireless connection. The camera 11 can be an industrial camera. It can be understood that, the camera 11 can be other camera, the disclosure is not limited herein. The AOI device 10 is configured to control the camera 11 to capture an image of a current object under test 12, obtain the captured image of the current object under test 12 from the camera 11, and store the image of the current object under test 12 into a hard disk of the AOI device 10. The AOI device 10 is further configured to perform an automated visual inspection on the images of objects under test, monitor a space available on the hard disk, and perform an image deletion according to the space available on the hard disk. It can be understood that, the camera 11 can be a built-in camera of the AOI device 10, namely, the AOI device 10 can further include the camera 11, the disclosure is not limited herein.

Figure 2:
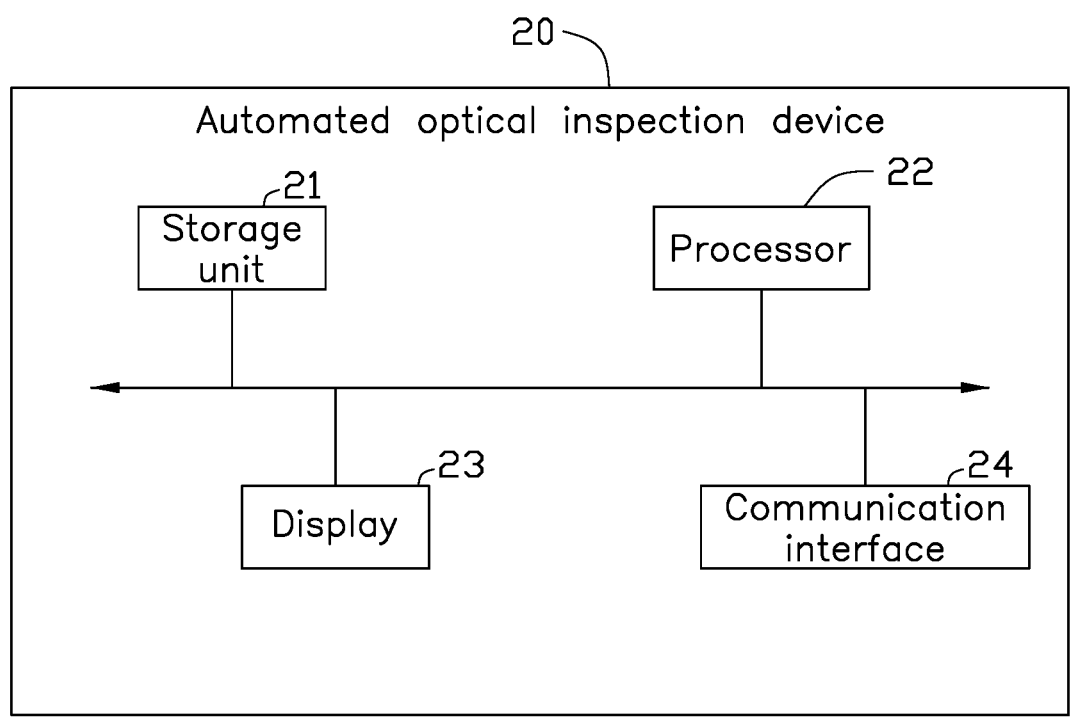
FIG. 2 is a structure view of an embodiment of the AOI device.

FIG. 2 is a structure view of an embodiment of an automated optical inspection device (AOI device 20). The AOI device 20 can be an industrial personal computer, a computer, or the like. The disclosure is not limited in type of the AOI device 20.

The AOI device 20 can include a storage unit 21, a processor 22, a display 23, and a communication interface 24. A person skilled in the art may understand that, the structure shown in FIG. 2 imposes no limitation on the AOI device 20, and the AOI device 20 may include more or fewer components than those shown in the figure, for example including a camera, or combine some components, or divide some components, or have different component arrangements.

The storage unit 21 may be configured to store a software program and module/unit. The processor 22 runs the software program and module/unit stored in the storage unit 21, and invokes the data stored in the storage unit 21, to implement various functions of the AOI device 20. The storage unit 21 may include a program storage area and a data storage area. The program storage area may store an operating system, an application program required by at least one function (such as an image display function), and the like. The data storage area may store data (such as image data) created according to use of the AOI device 20, and the like. In addition, the storage unit 21 may include a non-transitory storage medium, such as hard disk, memory, or the like. It can be understood that, the storage unit 21 may further include a non-transitory storage medium, such as a pluggable hard disk, a smart media card, a secure digital card, a flash card, at least one magnetic disk storage device, a flash storage unit, or another volatile solid-state storage device.

The processor 22 can include one or more central processing units, and further include general-purpose processors, digital signal processors, application specific integrated circuits, field-programmable gate arrays, or other programmable logic devices, discrete gate or transistor logic, discrete hardware components, and so on. The processor 22 can be a microprocessor or the processor 22 can be any conventional processor. The processor 22 is the control center of the AOI device 20, and is connected to various parts of the AOI device 20 by using various interfaces and lines.

The display 23 may be configured to display a still image, a video, and so on. The display 23 may include a display panel. Optionally, the display panel may be a liquid crystal display (LCD), an organic light-emitting diode (OLED), a flexible display panel, a plasma display panel, or the like. It can be understood that, the display 23 can further be configured to receive an input of the user. The display 23 can further include a touch panel, the disclosure is not limited herein.

The communication interface 24 can include a standard wired interface, a wireless interface, or the like. The communication interface 24 can allow the AOI device 20 to communicate with the camera.

Figure 3:
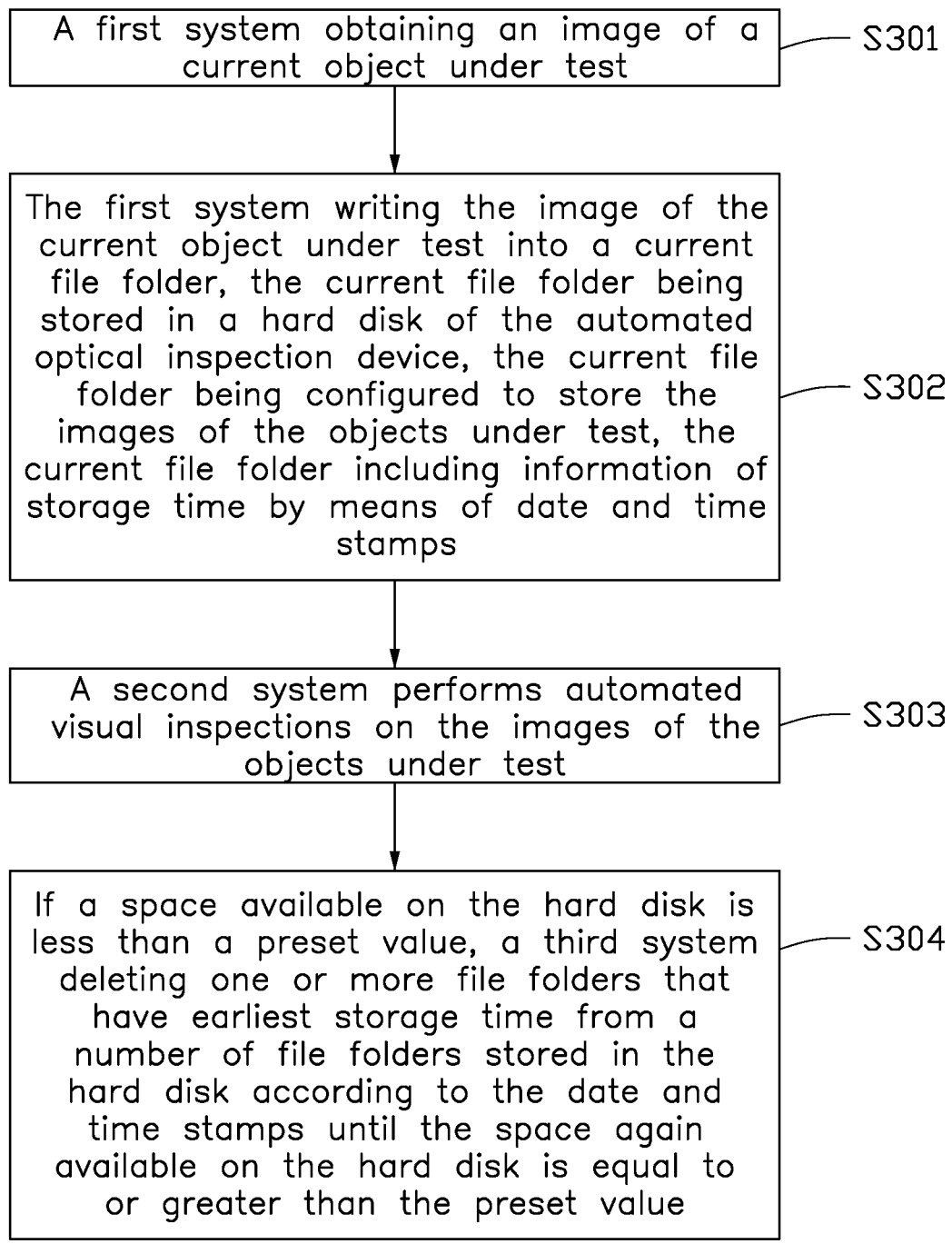
FIG. 3 is a flowchart of an embodiment of an accumulated data deletion method.
Figure 4:
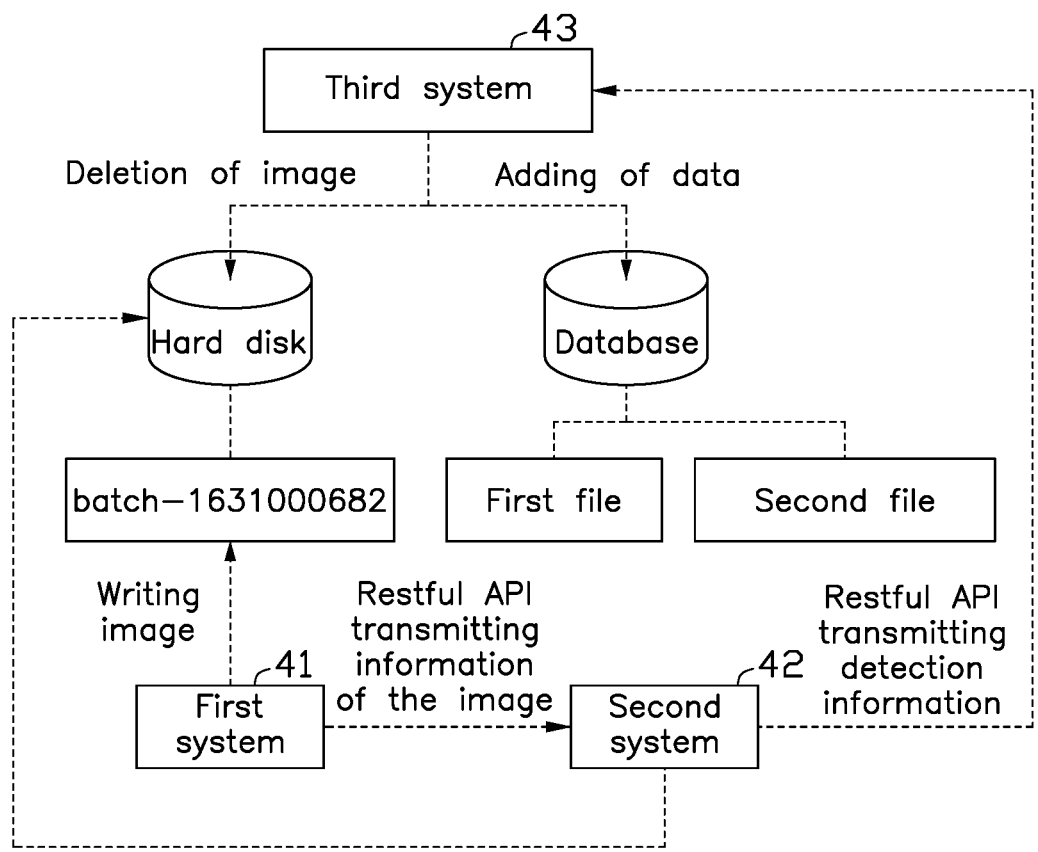
FIG. 4 is a framework view of an embodiment of an AOI device.

FIG. 3 is a flowchart of an embodiment of an accumulated data deletion method. The accumulated data deletion method is applied on the AOI as shown in the FIG. 2. Referring also to FIG. 4, FIG. 4 is a framework view of an embodiment of an automated optical inspection device (AOI device 40). The AOI device 40 includes a first system 41, a second system 42, and a third system 43. The first system 41 can be an image obtaining system. The second system 42 can be an AI/AOI automated inspection system. The third system 43 can be a data processing system. The second system 42 and the first system 41 can communicate with each other.

The second system 42 and the third system 43 can communicate with each other. The accumulated data deletion method includes:

At S301, the first system obtaining an image of a current object under test.

In some embodiments, the first system can control a camera coupled to the AOI device to capture an image of a current object under test, and obtain the captured image of the current object under test from the camera.

In some embodiments, the first system can obtain the image of the current object under test via a built-in camera of the AOI device.

In some embodiments, the object under test can be a product of an assembly line, for example, a printed circuit board, a connector, a semiconductor, a capacitor in chip form, or the like.

At S302, the first system writing the image of the current object under test into a current file folder, the current file folder being stored in a hard disk of the AOI device, the current file folder being configured to store the images of the objects under test, the current file folder including information of storage time by means of date and time stamps.

Figure 5:
FIG. 5 is a schematic view of an embodiment showing file folders stored in a hard disk.

The first system writes the image of the current object under test into the current file folder, as shown in the FIG. 4. In some embodiments, the hard disk can store a number of file folders, as shown in FIG. 5. In the FIG. 5, the hard disk stores a batch-1631005002 file folder, a batch-1631003562 file folder, a batch-1631002122 file folder, and a batch-1631000682 file folder. The file folders can be stored in a root directory of the hard disk, for example, a root directory/data/images as shown in the FIG. 5. The file folder are arranged in order from earliest to latest according to the information of the storage time. For example as shown in the FIG. 5, the batch-1631000682 file folder, the batch-1631002122 file folder, the batch-1631003562 file folder, and the batch-1631005002 file folder are arranged in order from earliest to latest according to the information of the storage times. The information of each storage time can be a creation time of the file folder, or can be write time of the first image into the file folder, namely, first write time, or can be write time of the last image into the file folder, namely last write time, or the like, the disclosure is not limited herein. The information of each storage time can be date and time stamps. The batch-1631005002 file folder is the current file folder. The batch-1631000682 file folder, the batch-1631002122 file folder, and the batch-1631003562 file folder are file folders created before the current file folder was created. Each file folder stores a number of images of the objects under test obtained within a preset duration. For example, current time is at 10:00:05, each file folder stores images of the objects under test obtained within one hour period, the image of the current object under test is obtained periodically, at 5 second intervals. Thus, the batch-1631002122 file folder stores images of the objects under test obtained between eight in the morning and nine in the morning, the batch-1631003562 file folder stores images of the objects under test obtained between nine in the morning and ten in the morning, the batch-1631005002 file folder stores image of the object under test obtained at the current time. It can be understood that, if the current time is at 10:02:00, the batch-1631005002 file folder stores the image of the object under test obtained at the current time and images of the objects under test obtained between ten in the morning and two past ten in the morning. It can be understood that, FIG. 5 is an example showing that the file folders are stored in the hard disk, the number of the file folders can be changed to a different number, the name of the file folder can be changed to a different name, and the order of the file folders can be changed, the content and the form of the storing of the file folder are not limited herein.

Figure 6:
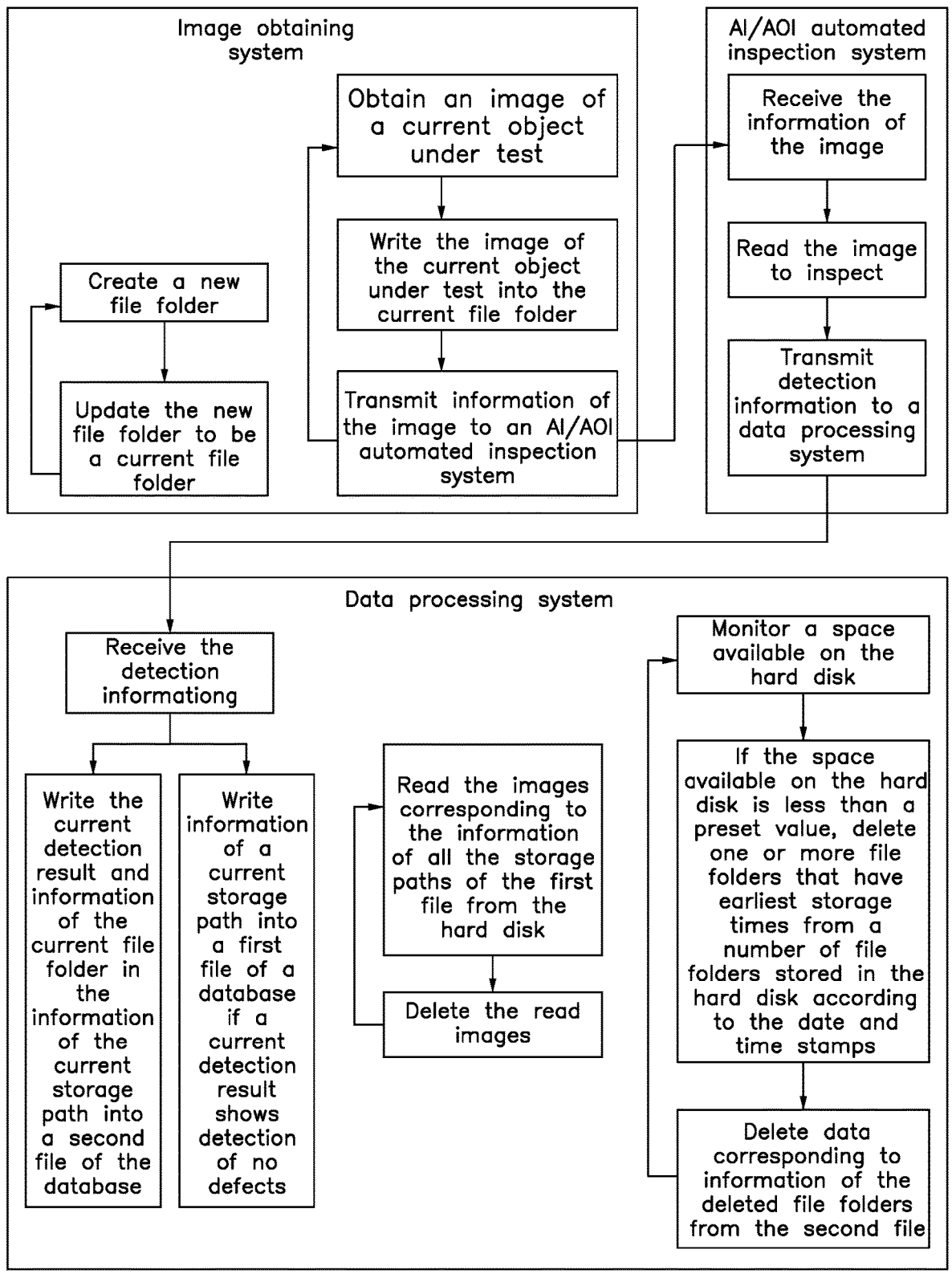
FIG. 6 is a schematic view of an embodiment of an accumulated data deletion method.
Figure 7:
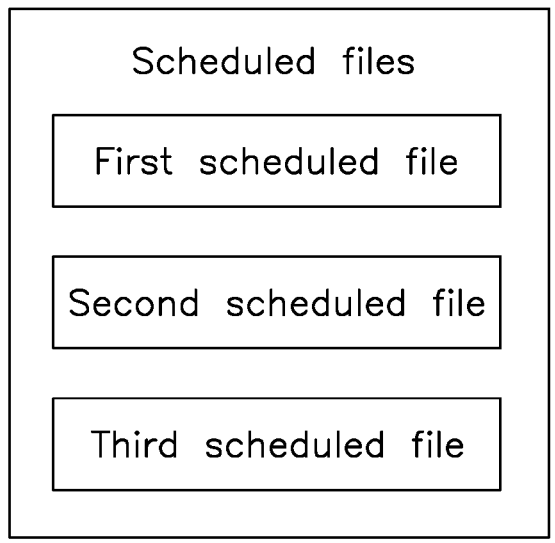
FIG. 7 is a schematic view of an embodiment of scheduled files.

In some embodiments, in the method, the first system creates a new file folder at a preset interval for creation and updates the new file folder to be the current file folder, as shown in FIG. 6. Thus, the images stored in different file folders are obtained at different times. In the FIG. 6, at the same time that the first system obtains the images and stores images, the first system creates the new file folder at the preset interval for creation and updates the new file folder to be the current file folder. Namely, a process whereby the first system obtains and stores the images and a process whereby the first system creates and updates the new file folder are two parallel flow paths, which do not interfere with each other. The AOI device stores one or more scheduled files, as shown in FIG. 7. In the FIG. 7, the scheduled files includes a first scheduled file. The first scheduled file includes a first scheduled content and a first scheduled period. The first scheduled content includes a creation of the file folder. The first scheduled period includes a preset time for creation, for example an one hour period. In some embodiments, the first system creates a new file folder at the preset interval for creation according to the first scheduled file and updates the new file folder to be the current file folder.

In some embodiments, the first system writes the image of the current object under test into the current file folder to generate information of a current storage path of the image of the current object under test. In some embodiments, the first system further transmits information of the image including the information of the current storage path to the second system via a representational state transfer (Restful) application programming interface (API), as shown in the FIG. 4. The Restful API is a network architecture interface. The Restful API defines a unified communication protocol. The Restful API can allow different software/systems to communicate with each other over the internet. The Restful API can bring together many different functions into the AOI device, for example, can bring together the first system and the second system into the AOI device. In some embodiments, the information of the image can further include size of the image.

At S303, the second system performs automated visual inspections on the images of objects under test.

In some embodiments, the second system can perform automated visual inspections on the images of objects under test to perform an automated optical inspection on some items of the object under test, for example, a color, an appearance, a size, a defect, or the like. For example, the second system can inspect a concavity of the object under test, a position of a breakage or fracture of the object under test, a position of soldered area of the object under test, and so on.

In some embodiments, the second system can receive the information of the image from the first system. As shown in the FIG. 4, the second system reads the image of the current object under test from the hard disk according to the information of the current storage path in the information of the image, and the second system performs the automated visual inspection on the image of the current object under test. Thus, the second system can perform the automated optical inspection on the current object under test.

In some embodiments, the second system further determines an actual size of the object under test according to the size of the image in the information of the image, thus an accuracy of the inspection can be improved.

In some embodiments, in the method, the second system transmits detection information including the information of the current storage path and a current detection result to the third system. The current detection result includes, for example the position and size of a fracture or break of the object under test, or that no breakage exists, as shown in the FIG. 4, the second system can transmit the detection information including the information of the current storage path and the current detection result to the third system via the Restful API. Thus, the Restful API can bring together the first system, the second system, and the third system into the AOI device.

At S304, if a space available on the hard disk is less than a preset value, the third system deleting one or more file folders that have earliest storage times from a number of file folders stored in the hard disk according to the date and time stamps, until the space again available on the hard disk is equal to or greater than the preset value.

In some embodiments, as shown in the FIG. 6, before the S304 step, in the method, the third system monitors whether the space available on the hard disk is less than the preset value. In some embodiments, as shown in the FIG. 7, the scheduled files further include a second scheduled file. The second scheduled file includes a second scheduled content and a second scheduled period. The second scheduled content includes a monitoring of the space available on the hard disk. The second scheduled period includes a preset monitoring time, for example a one second period, or the like. In some embodiments, the third system monitors whether the space available on the hard disk is less than the preset value according to the second scheduled file. Thus, the space of the hard disk can be freed up immediately. The images can be batch deleted via in a file folder manner, the large number of I/O operations can be avoided, and the system performance can be improved. When there is not enough space available on the hard disk, the accumulated data deletion method deletes the folders that have earliest storage times, thus a maximum of a reservation period can be ensured, an effective method to delete files can be performed, and a stable inspection process and a longer time running can be ensured.

In some embodiments, the third system deleting one or more file folders that have earliest storage times from a number of file folders stored in the hard disk according to the date and time stamps until the space again available on the hard disk is equal to or greater than the preset value includes that, the third system arranges the file folders in the hard disk in a preset sequence to form an arrangement according to the date and time stamps, and deletes one or more file folders that have earliest storage times from the arrangement according to a preset sequence, until the space available on the hard disk is equal to or greater than the preset value. The preset sequence includes from earliest to latest or from latest to earliest.

In some embodiments, as shown in the FIG. 6, the third system writes the information of the current storage path into a first file of a database if the current detection result shows detection of no defects. For example, as shown in the FIG. 4, the current detection result is that the object under test has no defect, thus the third system writes the information of the current storage path into an ok_images datasheet of the database. The database can be stored in the hard disk, can be a cloud database, or the like. In some embodiments, the third system can receive the detection information from the second system via the Restful API. The third system writes the information of the current storage path in the detection information into the first file of the database if the current detection result in the detection information shows detection of no defects.

In some embodiments, the third system can further delete the images corresponding to the information of all the storage paths of the first file from the hard disk at a preset interval for deletion, as shown in the FIG. 6. In the FIG. 6, the third system reads the images corresponding to the information of all the storage paths of the first file from the hard disk at the preset interval for deletion, the third system further deletes the read images. At the same time that the third system writes the information of the current storage path into the first file of the database, the third system can further delete the images corresponding to the information of all the storage paths of the first file from the hard disk, at a preset interval for deletion. Namely, the process whereby the third system writes the information of the current storage path into the first file of the database and the process whereby the third system deletes the images corresponding to the information of all the storage paths of the first file from the hard disk are two parallel flow paths, which do not interfere with each other. In some embodiments, as shown in FIG. 7, the scheduled files further includes a third scheduled file. The third scheduled file includes a third scheduled content and a third scheduled period. The third scheduled content includes a deletion of the images whose detections show no defects. The third scheduled period includes a preset time for deletion, for example a 30 second period. In some embodiments, the third system can further delete the images corresponding to the information of all the storage paths of the first file from the hard disk at the preset interval for deletion according to the third scheduled file. Thus, the accumulated data deletion method can delete the image whose detections show no defects from the hard disk and reserve the images whose detections reveal defects, thus a selective deletion of the images can be achieved, a reservation period of the images whose detections show one or more defects can be improved, thereby the maximum of the reservation period of the images whose detections show defects is obtained. Thus, the images showing one or more defects can be utilized to implement more applications, for example, an analysis of yield rate of a production line, an analysis of defect concentration, and so on.

In some embodiments, the third system further deletes data corresponding to the deleted images from the first file of the database. Thus, after deleting the images whose detections show no defects, the information of the storage paths corresponding to the images can be also deleted from the first file.

In some embodiments, as shown in the FIG. 6, in the method, the third system further writes the current detection result and the information of the current file folder in the information of the current storage path into a second file of the database. The second file can be utilized for subsequent analysis and can determine a running state of production lines together with the images. The third system writing the current detection result and the information of the current file folder in the information of the current storage path into the second file of the database includes that, the third system extracts the information of the current file folder from the information of the current storage path, the third system writes the current detection result and the information of the current file folder into the second file of the database. Taking the information of the storage path of the image 1_2021-0901.png as the current file folder in the aforementioned FIG. 5, as an example, the information of the current file folder is /data/images/batch-1631000682/1_2021-0901.png, and the information of the current file folder in the information of the current storage path is batch-1631000682. The second file of the database can be, for example an inference_result datasheet, thus, for example, as shown in the FIG. 4, the current detection result and batch-1631000682 are written into the inference_result datasheet of the database. Thus, the inference_result datasheet stores all the detection results and information of the file folders in the information of all the storage paths. In some embodiments, when the third system writes the current detection result and the information of the current file folder in the information of the current storage path into the second file of the database, the third system further adds a column for the information of the current file folder. The column is configured to indicate that stored information is the information of the current file folder. The name of the column can be, for example, a name of the stored file folder. In some embodiment, before the S304 step, in the method, the third system writes the current detection result and the information of the current file folder in the information of the current storage path into the second file of the database.

In some embodiments, as shown in the FIG. 6, the third system deletes data corresponding to the information of the deleted file folders from the second file of the database. For example, the third system deletes the data corresponding to the information of the deleted file folder from the aforementioned inference_result datasheet. Thus, a number of earliest data recorded in the inference_result datasheet can be deleted. In some embodiment, after the S304, in the method, the third system deletes data corresponding to information of the deleted file folders from the second file of the database.

In some embodiments, the process whereby the third system writes the data into the second file of the database and the process whereby the third system monitors the space available on the hard disk and deletes one or more file folders that have earliest storage times are two parallel flow paths, which do not interfere with each other.

Figure 8:
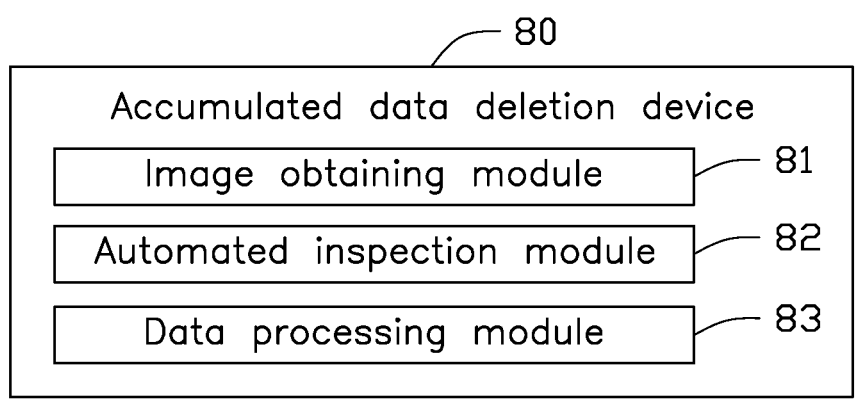
FIG. 8 is a schematic view of an embodiment of an accumulated data deletion device.

FIG. 8 is a schematic view of an embodiment of a data deletion device. The data deletion device 80 includes an image obtaining module 81, an automated inspection module 82, and a data processing module 83. The image obtaining module 81 is configured to obtain an image of a current object under test. The image obtaining module 81 is further configured to write the image of the current object under test into a current file folder. The current file folder is stored in a hard disk of an AOI device. The current file folder is configured to store the images of the objects under test. The current file folder includes information of storage time by means of date and time stamps. The automated inspection module 82 is configured to perform automated visual inspections on the images of objects under test. If a space available on the hard disk is less than a preset value, the data processing module 83 is configured to delete one or more file folders that have earliest storage times from the file folders stored in the hard disk according to the date and time stamps, until the space available on the hard disk is equal to or greater than the preset value.

In some embodiments, the image obtaining module 81 is further configured to create a new file folder at a preset interval for creation. The image obtaining module 81 is further configured to update the new file folder to be the current file folder.

In some embodiments, the image obtaining module 81 is further configured to write the image of the current object under test into the current file folder to generate information of a current storage path of the image of the current object under test. The data processing module 83 is further configured to write the information of the current storage path into a first file of a database if a current detection result shows detection of no defects. The data processing module 83 is further configured to delete the images corresponding to the information of all the current storage paths of the first file from the hard disk at a preset interval for deletion.

In some embodiments, the data processing module 83 is further configured to write the current detection result and information of the current file folder in the information of the current storage path into a second file of the database. The second file can be utilized for subsequent analysis and can determine a running state of production lines together with the images. The data processing module 83 is further configured to delete data corresponding to information of the deleted file folders from the second file of the database.

In some embodiments, the image obtaining module 81 is further configured to transmit information of the image including the information of the current storage path to the automated inspection module 82. The automated inspection module 82 is further configured to read the image of the current object under test from the hard disk according to the information of the current storage path in the information of the image. The automated inspection module 82 is further configured to perform the automated visual inspection on the image of the current object under test.

In some embodiments, the automated inspection module 82 is further configured to transmit detection information including the information of the current storage path and the current detection result to the data processing module 83. The data processing module 83 is further configured to write the information of the current storage path in the detection information into the first file of the database if the current detection result in the detection information shows detection of no defects.

In some embodiments, the second system and the first system communicate with each other via a representational state transfer application programming interface, and the third system and the second system communicate with each other via the representational state transfer application programming interface.

In some embodiments, the embodiment of the present document further provides a computer storage medium where computer executable instructions are stored herein, the computer executable instructions are used for executing the accumulated data deletion method in the FIG. 3.

The embodiment relates to a computer program product comprising one or more computer executable instructions, the computer executable instructions are stored in the computer storage medium. One or more processors of an AOI device can read the computer executable instructions from the computer storage medium. The processor can execute the one or more computer executable instructions to accomplish the steps of the accumulated data deletion method in the FIG. 3.

The disclosure performs an automatic inspection on the image of the current object under test, thus an AI/AOI inspection can be achieved. The disclosure writes the image of the current object under test into the current file folder and deletes one or more file folders that have earliest storage times until the space available on the hard disk is equal to or greater than the preset value, thus the images can be batch deleted via in a file folder manner, the large amount of I/O operations can be avoided and the system performance can be improved. When there is not enough space available on the hard disk, the disclosure deletes the folders that have earliest storage times, thus a maximum of a reservation period can be ensured, an effective method to delete files can be performed, and a stable inspection process and a long time running can be ensured. The disclosure brings together three different systems which are respectively the first system, the second system, and the third system into the AOI device, thus a cooperation among the different systems can be achieved by the AOI device, and it is convenient for the software development.

In the several embodiments provided in the present application, it should be understood that the disclosed device and method may be implemented in other manners. For example, the described device embodiment is merely exemplary. For example, the module division or the unit division is merely a logical function division and there may be other bases of division in actual implementation. For example, multiple units or components may be combined or integrated into another device, or some features may be ignored or not performed.

In addition, functional units in the embodiments of the present invention may be integrated into one processing unit, or each of the units may exist alone physically, or two or more units are integrated into one unit.

Based on the description of the foregoing implementation manners, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An accumulated data deletion method applied on an automated optical inspection device with a plurality of systems, the system comprising a first system, a second system, and a third system, the method comprising:
   obtaining an image of a current object under test via the first system;
   writing the image of the current object under test into a current file folder via the first system, the current file folder being stored in a hard disk of the automated optical inspection device, the current file folder being configured to store images of the objects under test, the current file folder comprising information of storage time by means of data and time stamps;
   performing automated visual inspections on the images of the objects under test via the second system; and
   if a space available on the hard disk is less than a preset value, deleting one or more file folders that have earliest storage times from a plurality of file folders stored in the hard disk via the third system according to the date and time stamps until the space again available on the hard disk is equal to or greater than the preset value;
   wherein:
   the writing the image of the current object under test into a current file folder via the first system comprises:
   writing the image of the current object under test into the current file folder to generate information of a current storage path of the image of the current object under test via the first system;
   the method further comprises:
   writing the information of the current storage path into a first file of a database via the third system if a current detection result shows detection of no defects; and
   deleting the images corresponding to the information of all the current storage paths of the first file from the hard disk at a preset interval for deletion via the third system.

2. The method according to claim 1, further comprising:
   creating a new file folder at a preset interval for creation via the first system; and
   updating the new file folder to be the current file folder via the first system.

3. The method according to claim 1, wherein:
   before if a space available on the hard disk is less than a preset value, deleting one or more file folders that have earliest storage times from a plurality of file folders stored in the hard disk via the third system according to the date and time stamps until the space again available on the hard disk is equal to or greater than the preset value, the method further comprises:

writing the current detection result and information of the current file folder in the information of the current storage path into a second file of the database via the third system;

after if a space available on the hard disk is less than a preset value, deleting one or more file folders that have earliest storage times from a plurality of file folders stored in the hard disk via the third system according to the date and time stamps until the space again available on the hard disk is equal to or greater than the preset value, the method further comprises:

deleting data corresponding to information of the deleted file folders from the second file of the database via the third system.

4. The method according to claim 1, wherein:

the method further comprises:

transmitting information of the image comprising the information of the current storage path to the second system via the first system;

performing the automated visual inspections on the images of the objects under test via the second system comprises:

reading the image of the current object under test from the hard disk via the second system according to the information of the current storage path in the information of the image; and performing the automated visual inspection on the image of the current object under test via the second system.

5. The method according to claim 1, wherein:

the method further comprises:

transmitting detection information comprising the information of the current storage path and the current detection result to the third system via the second system;

the writing the information of the current storage path into the first file of the database via the third system if the current detection result shows detection of no defects comprises:

writing the information of the current storage path in the detection information into the first file of the database via the third system if the current detection result in the detection information shows detection of no defects.

6. The method according to claim 1, wherein a communication between the second system and the first system is via a representational state transfer application programming interface, and a communication between the third system and the second system is via the representational state transfer application programming interface.

7. An automated optical inspection device comprising a plurality of systems, the system comprising a first system, a second system, and a third system, the device further comprising:

a storage device;

at least one processor; and the storage device storing one or more programs, which when executed by the at least one processor, cause the at least one processor to:

obtain an image of a current object under test via the first system;

write the image of the current object under test into a current file folder via the first system, the current file folder being stored in a hard disk of the automated optical inspection device, the current file folder being configured to store images of the objects under test, the current file folder comprising information of storage time by means of date and time stamps;

perform automated visual inspections on the images of the objects under test via the second system; and if a space available on the hard disk is less than a preset value, delete one or more file folders that have earliest storage times from a plurality of file folders stored in the hard disk via the third system according to the date and time stamps until the space again available on the hard disk is equal to or greater than the preset value;

wherein the at least one processor is further caused to:

write the image of the current object under test into the current file folder to generate information of a current storage path of the image of the current object under test via the first system;

write the information of the current storage path into a first file of a database via the third system if a current detection result shows detection of no defects; and delete the images corresponding to the information of all the current storage paths of the first file from the hard disk at a preset interval for deletion via the third system.

8. The device according to claim 7, further causing the at least one processor to:

create a new file folder at a preset interval for creation via the first system; and update the new file folder to be the current file folder via the first system.

9. The device according to claim 7, further causing the at least one processor to:

write the current detection result and information of the current file folder in the information of the current storage path into a second file of the database via the third system; and delete data corresponding to information of the deleted file folders from the second file of the database via the third system.

10. The device according to claim 7, further causing the at least one processor to:

transmit information of the image comprising the information of the current storage path to the second system via the first system;

read the image of the current object under test from the hard disk via the second system according to the information of the current storage path in the information of the image; and perform the automated visual inspection on the image of the current object under test via the second system.

11. The device according to claim 7, further causing the at least one processor to:

transmit detection information comprising the information of the current storage path and the current detection result to the third system via the second system; and write the information of the current storage path in the detection information into the first file of the database via the third system if the current detection result in the detection information shows detection of no defects.

12. The device according to claim 7, wherein:

a communication between the second system and the first system is via a representational state transfer application programming interface, and a communication between the third system and the second system is via the representational state transfer application programming interface.

13. A non-transitory storage medium storing a set of commands, when the commands being executed by at least one processor of an automated optical inspection device, the automated optical inspection device comprising a plurality of systems, the system comprising a first system, a second system, and a third system, causing the at least one processor to:

obtain an image of a current object under test via the first system;

write the image of the current object under test into a current file folder via the first system, the current file folder being stored in a hard disk of the automated optical inspection device, the current file folder being configured to store images of the objects under test, the current file folder comprising information of storage time by means of date and time stamps;

perform automated visual inspections on the images of the objects under test via the second system; and if a space available on the hard disk is less than a preset value, delete one or more file folders that have earliest storage times from a plurality of file folders stored in the hard disk via the third system according to the date and time stamps until the space again available on the hard disk is equal to or greater than the preset value;

wherein the at least one processor is further caused to:

write the image of the current object under test into the current file folder to generate information of a current storage path of the image of the current object under test via the first system;

write the information of the current storage path into a first file of a database via the third system if a current detection result shows detection of no defects; and delete the images corresponding to the information of all the current storage paths of the first file from the hard disk at a preset interval for deletion via the third system.

14. The non-transitory storage medium according to claim 13, further causing the at least one processor to:

create a new file folder at a preset interval for creation via the first system; and update the new file folder to be the current file folder via the first system.

15. The non-transitory storage medium according to claim 13, further causing the at least one processor to:

write the current detection result and information of the current file folder in the information of the current storage path into a second file of the database via the third system; and delete data corresponding to information of the deleted file folders from the second file of the database via the third system.

16. The non-transitory storage medium according to claim 13, further causing the at least one processor to:

transmit information of the image comprising the information of the current storage path to the second system via the first system;

read the image of the current object under test from the hard disk via the second system according to the information of the current storage path in the information of the image; and perform the automated visual inspection on the image of the current object under test via the second system.

17. The non-transitory storage medium according to claim 13, further causing the at least one processor to:

transmit detection information comprising the information of the current storage path and the current detection result to the third system via the second system; and write the information of the current storage path in the detection information into the first file of the database via the third system if the current detection result in the detection information shows detection of no defects.

* * * * *